United States Patent [19]

Asada et al.

[11] 4,439,352

[45] Mar. 27, 1984

[54] RESISTOR COMPOSITIONS AND RESISTORS PRODUCED THEREFROM

[75] Inventors: Eiichi Asada, Tokyo; Toshio Inokuma, Fujisawa; Hiroyuku Saito, Oume, all of Japan

[73] Assignee: Shoei Chemical Inc., Tokyo, Japan

[21] Appl. No.: 446,084

[22] Filed: Dec. 1, 1982

[30] Foreign Application Priority Data

Dec. 29, 1981 [JP] Japan ................................ 56-210207
Oct. 1, 1982 [JP] Japan ................................ 57-173708

[51] Int. Cl.³ ................................................ A01B 1/06

[52] U.S. Cl. .................................... 252/518; 252/521; 106/1.24; 427/126.2; 427/126.5; 427/383.5; 428/432; 428/434

[58] Field of Search ......................... 252/514, 518, 521; 338/20, 308, 307, 314; 106/1.22, 1.24, 73-75, 77; 428/432, 434, 469; 29/620 R; 427/126.1, 126.2, 126.5, 383.3, 383.5

[56] References Cited

U.S. PATENT DOCUMENTS

| | | | |
|---|---|---|---|
| 4,101,708 | 7/1978 | Larry | 252/521 |
| 4,160,227 | 7/1979 | Ikegami et al. | 338/22 R |
| 4,160,748 | 7/1979 | Vodogawa et al. | 252/521 |
| 4,267,074 | 5/1981 | Holmes et al. | 252/514 |
| 4,286,251 | 8/1981 | Howell | 252/514 |
| 4,293,839 | 10/1981 | Asada et al. | 252/514 |
| 4,312,770 | 1/1982 | Yu et al. | 252/514 |
| 4,350,618 | 9/1982 | Hilson et al. | 252/514 |
| 4,362,656 | 12/1982 | Hounudaly | 252/518 |

*Primary Examiner*—Josephine Barr
*Attorney, Agent, or Firm*—Flynn, Thiel, Boutell & Tanis

[57] ABSTRACT

Resistor compositions are disclosed which comprise: (a) ruthenium oxide; (b) glass; (c) at least one metal oxide selected from the group consisting of lanthanum oxide, neodymium oxide, praseodymium oxide and samarium oxide; and (d) an organic vehicle. Resistors are produced using this composition by firing a resistor film comprising ruthenium oxide, glass and at least one metal oxide selected from the group consisting of lanthanum oxide, neodymium oxide, praseodymium oxide and samarium oxide onto an electrically insulating substrate. The use of the metal oxides in the resistor compositions surprisingly improve the TCR (temperature coefficient of resistance) particularly in high resistance ranges, and brings the TCR close to zero. In addition to the effect of improving the TCR, the metal oxides increase resistance and improve noise and VCR (voltage coefficient of resistance) properties.

11 Claims, No Drawings

RESISTOR COMPOSITIONS AND RESISTORS PRODUCED THEREFROM

BACKGROUND OF THE INVENTION

The present invention relates to improved resistor compositions and resistors produced therefrom. More particularly, the present invention relates to ruthenium oxide-glass type thick film resistor compositions and resistors produced therefrom in which resistor properties such as temperature coefficient of resistance (hereinafter referred to as TCR), noise and voltage coefficient of resistance (hereinafter referred to as VCR) are surprisingly improved in high resistance ranges.

Thick film resistors produced by firing a film comprising ruthenium oxide and glass onto a surface of an electrically insulating substrate change in resistance over a wide range of from a few ohms per square to 10 megohms per square the weight ratio of ruthenium oxide to glass varies in the range of from 60:40 to 5:95. Thus, usually desired resistances are obtained by controlling the weight ratio.

In practical use of such resistors, it is preferred that their resistances not change due to changes in ambient temparature, in other words, that the TCR is zero. As to the relation between resistance and TCR, although there are differences depending on particle size of ruthenium oxide, glass composition and particle size of glass, generally speaking, a resistance region having a TCR of zero exists only in medium resistance ranges. However, when the resistance is below the region of zero TCR, TCR values increase positively with decreasing resistance values, and, on the other hand, higher resistance ranges above the region render TCR values more negative with increasing resistance values. Thus, the conventional resistors described above are liable to be affected by ambient temperatures in almost all resistance ranges and it is very difficult to control the absolute TCR to zero.

As conventional means for improving TCR, it has been well-known to add various additives to the resistor compositions. For example, TCR adjusting additives such as $MnO_2$, $Al_2O_3$, $TiO_2$ and $ZrO_2$ have an effect of shifting TCR in a negative direction, and, thus, these additives are effective and useful for resistors in low resistance ranges having a highly positive TCR. However, as to the cases of resistors in high resistance ranges, no satisfactory solution has been found to date despite many studies and attempts. For example, in U.S. Pat. No. 3,324,049, addition of copper oxide to resistor compositions and the use of glass containing copper oxide as a glass forming constituent are disclosed as means for adjusting TCR.

The addition of copper oxide or the use of copper oxide containing glass can allow highly negative TCR values to come near to zero, but, simultaneously, unfavorable reduction in resistance and deterioration of VCR are unavoidably caused. As a way of further adjusting TCR values, British Pat. No. 1,470,497 describes that addition of colloidal AlOOH to resistor compositions serves to adjust the TCR in a positive direction. However, this adjusting method simultaneously causes a significant reduction in resistance. As a result, it is impossible to obtain resistors having TCR values close to zero in the high resistance ranges. Further, TCR has been adjusted by coarsening respective particle sizes of ruthenium oxide and glass. However, this method results in an unfavorable increase of noise level and a wide variation in resistance value and, thus, this method is not practicable. As mentioned above the conventional methods cannot satisfactorily improve the TCR property in the high resistance ranges.

BRIEF SUMMARY OF THE INVENTION

It is therefore an object of the present invention to eliminate the above disadvantages associated with the prior art, and particularly to improve TCR, noise and VCR of ruthenium oxide-glass type resistors in high resistance ranges.

In order to eliminate the foregoing disadvantages and problems of the conventional resistors, we have carried out extensive studies and, as a result, found that ruthenium oxide-glass resistors having high resistance are significantly improved in TCR, noise and VCR by adding effective amounts of at least one oxide selected from the group consisting of lanthanum oxide, neodymium oxide, praseodymium oxide and samarium oxide thereto.

According to the present invention, there are provided resistor compositions comprising: (a) ruthenium oxide; (b) glass; (c) at least one metal oxide selected from the group consisting of lanthanum oxide, neodymium oxide, praseodymium oxide and samarium oxide; and (d) an organic vehicle. Resistors are produced using the resistor composition above by firing a resistor film onto an electrically insulating substrate, the resistor film comprising (a) ruthenium oxide; (b) glass; and (c) at least one metal oxide selected from the group consisting of lanthanum oxide, neodymium oxide, praseodymium oxide and samarium oxide.

Other advantages and features of this invention will be apparent from the following detailed description.

DETAILED DESCRIPTION OF THE PREFERRED EMBODIMENTS

As mentioned above briefly, according to one feature of this invention, the resistor compositions of the present invention comprise (a) ruthenium oxide; (b) glass; (c) at least one metal oxide selected from the group consisting of lanthanum oxide, neodymium oxide, praseodymium oxide and samarium oxide; and (d) organic vehicle.

According to a further feature of the invention, resistors are produced from the above-mentioned resistor compositions by firing a resistor film onto an electrically insulating substrate, the resistor film comprising (a) ruthenium oxide; (b) glass; and (c) at least one metal oxide selected from the group consisting lanthanum oxide, neodymium oxide, praseodymium oxide and samarium oxide.

In the resistor compositions, the additive oxides, lanthanum oxide, neodymium oxide, praseodymium oxide and samarium oxide, to be added to the ruthenium-glass resistor serves effectively to bring the TCR close to zero, and, further, have a surprising effect of increasing the resistance. Hereinafter, the term "additive oxides" or "additives" is used to mean lanthanum oxide, neodymium oxide, praseodymium oxide and samarium oxide. The effect imparted by the additive oxides of the invention is extremely unique, taking into account the fact that conventional additives cause unavoidably reductions of resistance. Thus, the resistors of the present invention have, in addition to the effect of improved TCR, effects of reduction of noise level and improvement in VCR, because in production of resistors having a certain resistance, the resistor film of the present invention can contain a relatively large amount of a conductive material and a smaller amount of glass as compared with the conventional resistor films. As above mentioned, the additives employed in the present invention have unexpectedly superior effects over the prior art and they may be used either singly or in combination of two or more thereof.

Ruthenium oxide and the glass used in the resistor composition of the present invention may be those usually used in the art and are employed in finely divided powder form. Although the proportions of these components may vary over a wide range depending primarily on intended resistance values, particularly, weight ratios of ruthenium oxide to glass ranging from 30:70 to 5:95 are preferred for the purpose of the invention. Preferred examples of the glass employed in the invention are borosilicate glasses such as lead borosilicate and borate glasses. Ruthenium oxide may be incorporated into the glass in the conventional appropriate manner prior to preparing the resistor compositions.

The organic vehicles are used in this invention are any of the conventional organic vehicles as long as they are volatilized or burnt out by firing. Examples of the organic vehicle for the purpose of the invention are organic solvents such as terpineol, butylcarbitol, butylcarbitolacetate or the like; and the mixtures of these organic solvents and resins such as ethyl cellulose, nitrocellulose, alkyd resin, etc., or plasticizer. In the present invention, the organic vehicle is used in order to provide the resistor compositions in paste or ink form and its amount is adjusted depending on the manner of application.

Particle sizes of the aforesaid additives are, although there is no specified limitation, preferably not more than 10 $\mu$m and most preferably in the range of from 0.1 to 2 $\mu$m. These additives may be incorporated together with or without ruthenium oxide into glass prior to being dispersing in the organic vehicle. The total amount of additive oxides is preferably in the range of from 0.05 to 7 parts by weight per 100 parts by the combined weight of ruthenium oxide and the glass. When less than 0.05 parts by weight of the additive oxides is used, the above-mentioned effects cannot be satisfactorily obtained. On the other hand, the use of additive oxides in amounts exceeding 7 parts by weight will detrimentally shift TCR to unacceptably negative values and, thus, such excessive amounts are undesirable for the purpose of improving TCR contemplated by the present invention.

Particularly, the use of the additive oxides of the present invention is very effective for preparation of resistors in high resistance ranges wherein the weight ratio of ruthenium oxide to glass is in the range of from 30:70 to 5:95.

The resistor compositions of this invention are prepared by uniformly admixing the above components and applying them in a desired pattern in an ordinary manner onto an insulating substrate on which terminals are formed in the conventional manner. As the insulating substrate, any conventional substrate, for example, ceramic, glass, porcelained enamel steel or the like, is employed. Thereafter, the resistor composition applied onto the insulating substrate is dried and fired at a temperature of 500° to 1000° C. to provide resistors of this invention.

In the following invention is described in more detail by referring to preferred examples of the present invention and comparative examples. The following examples should be interpreted as illustrative and are not limiting. In the following examples, all parts, ratios and percentages are expressed by weight, unless otherwise specified.

In Table 1 below, Examples 1 through 20 according to the present invention are shown in comparison with Comparative Examples 1 to 7. For purposes of comparison, tested properties are summarized in combinations of resistors of the present invention and a comparative example both having almost the same resistance. With exception of Examples 4, 7 and 17 to 20, the respective resistor compositions of Examples and Comparative Examples were prepared by admixing ingredients in proportions given in Table 1 and roll-mixing to provide uniformly dispersed pastes. Glass in a finely divided state employed in the resistor compositions consisted of 52.0% PbO, 8.3% $B_2O_3$, 36.5% $SiO_2$, and 3.3% $Al_2O_3$ and its average particle size was 3 $\mu$m. Further, fine ruthenium oxide particles having a specific surface area of 23 $m^2/g$ were utilized and the organic vehicle was a uniform mixture of 7.5 parts ethylcellose, 32.5 parts terpineol and 5.0 parts dibutyl phthalate.

For preparing the resistor composition of Example 4, a homogeneous mixture of ruthenium oxide, glass and lanthanum oxide was placed into a platinum crucible, heated to the fusing temperature of the glass and rapidly quenched. The thus formed glass containing ruthenium oxide and lanthanum oxide in the amounts given in Table 1 was then ground finely and dispersed uniformly in the organic vehicle as above mentioned to form a resistor paste.

In Example 7, the mixture of glass and lanthanum oxide was treated in the same manner as in the case of Example 4 to produce finely divided glass containing lanthanum oxide. The treated glass and finely divided ruthenium oxide in amounts shown in Table 1 were dispersed uniformly in the organic vehicle set forth above to produce a resistor composition in paste form. Similarly, in Example 17, the glass and neodymium oxide were mixed in respective proportions given in Table 1 and treated to form neodymium oxide-containing glass. The neodymium oxide containing glass was then admixed with ruthenium oxide, praseodymium oxide and an organic vehicle to provide a resistor paste having the composition given in Table 1.

Further, for preparing the resistor compositions of Examples 18 to 20, respective homogeneous mixtures of glass and two additive oxides selected from the group consisting of praseodymium oxide, samarium oxide, lanthanum oxide and neodymium oxide were placed into the platinum crucible, heated to the fusing temperature of the glass and rapidly quenched. Then the glasses containing two additive oxides in respective proportions shown in Table 1 were milled finely and were thoroughly admixed with ruthenium oxide and the organic vehicle to provide the resistor pastes. In Table 1, an asterisk (*) means ruthenium oxide and additive oxides were incorporated into the glass prior to forming the resistor compositions.

The thus obtained resistor compositions each were screen-printed in a pattern of 1 mm×1 mm onto an alumina substrate having terminals of Ag-Pd type thick film conductors, dried and fired at a peak temperature of 850° C. in a belt furnace, the firing period at the peak temperature being 10 minutes.

In produced resistors, resistance, TCR, noise and VCR were measured and the results are given in Table 1. The resistances were measured by using Digital Multimeter (MODEL TR-6855) manufactured by Takeda Riken Co., Ltd. and the resistance values shown in Table 1 each denotes the sheet resistivity in ohms per square of the resistor film having a thickness of 12 μm. TCR measurements were conducted in a temperature range of from −25° to +125° C. The noise level was measured using Resistor-Noise Test Set (MODEL-2136) manufactured by Quan-Tech Laboratories, Inc. A low noise level is desirable. VCR measurements were carried out in the voltage range of 10 to 100 V, using a Megohm Bridge (Model-1644A) manufactured by General Radio Co., and it is preferable that the VCR value as well as the TCR value be as close as possible to zero.

TABLE 1

| | Ruthenium Oxide (part) | Glass (part) | Lanthanum Oxide (part) | Neodymium Oxide (part) | Praseodymium Oxide (part) | Samarium Oxide (part) | Organic Vehicle (part) | Sheet Resistivity (Ohms/sq.) | TCR (ppm/°C.) | Noise (dB) | VCR (%/V) |
|---|---|---|---|---|---|---|---|---|---|---|---|
| Example 1 | 24.5 | 75.5 | 3.0 | — | — | — | 45.0 | 141.0KΩ | −60 | −13.0 | +0.2 |
| Comparative Example 1 | 19.0 | 81.0 | — | — | — | — | 45.0 | 132.0KΩ | −130 | −5.4 | +0.7 |
| Example 2 | 24.5 | 75.5 | 5.0 | — | — | — | 45.0 | 199.8KΩ | −85 | −13.0 | +0.1 |
| Comparative Example 2 | 17.5 | 82.5 | — | — | — | — | 45.0 | 205.2KΩ | −140 | −4.4 | +0.4 |
| Example 3 | 16.3 | 83.7 | 1.0 | — | — | — | 45.0 | 552.4KΩ | −90 | −8.0 | −0.1 |
| Comparative Example 3 | 14.3 | 85.7 | — | — | — | — | 45.0 | 525.3KΩ | −165 | −3.0 | −0.5 |
| Example 4 | 16.3* | 83.7 | 2.0* | — | — | — | 45.0 | 1.124MΩ | −70 | −8.0 | −0.2 |
| 5 | 14.3 | 85.7 | 1.0 | — | — | — | 45.0 | 1.203MΩ | −95 | −6.0 | −0.4 |
| 6 | 14.3 | 85.7 | 0.5 | 1.0 | — | — | 45.0 | 1.401MΩ | −75 | −6.0 | −6.0 |
| Comparative Example 4 | 11.3 | 88.7 | — | — | — | — | 45.0 | 1.276MΩ | −170 | −1.0 | −0.8 |
| Example 7 | 16.3 | 83.7 | 5.0* | — | — | — | 45.0 | 2.803MΩ | −100 | −5.0 | −1.0 |
| 8 | 14.3 | 85.7 | 2.0 | — | — | — | 45.0 | 2.296MΩ | −75 | −5.0 | −0.8 |
| 9 | 11.3 | 88.7 | 0.5 | — | — | — | 45.0 | 2.522MΩ | −91 | −0.9 | −0.8 |
| 10 | 11.3 | 88.7 | — | 1.0 | — | — | 45.0 | 2.441MΩ | −58 | −0.8 | −0.8 |
| Example 11 | 15.0 | 85.0 | — | — | 2.0 | — | 45.0 | 1.65MΩ | −70 | −5 | −0.6 |
| 12 | 17.0 | 83.0 | — | — | 5.0 | — | 45.0 | 2.15MΩ | −65 | −4 | −1.0 |
| Comparative Example 5 | 10.0 | 90.0 | — | — | — | — | 45.0 | 2.73MΩ | −186 | +10 | −5.9 |
| Example 13 | 15.0 | 85.0 | — | — | — | 2.0 | 45.0 | 635KΩ | −186 | −5 | −0.5 |
| 14 | 17.0 | 83.0 | — | — | — | 5.0 | 45.0 | 410KΩ | −110 | −8 | +0.5 |
| Comparative Example 6 | 15.0 | 85.0 | — | — | — | — | 45.0 | 450KΩ | −150 | −3 | −0.5 |
| 7 | 17.0 | 83.0 | — | — | — | — | 45.0 | 380KΩ | −140 | −5 | −0.8 |
| Example 15 | 10.0 | 90.0 | — | — | 2.0 | 1.0 | 45.0 | 5.22MΩ | −79 | −4 | −0.8 |
| 16 | 10.0 | 90.0 | 1.0 | — | 1.0 | — | 45.0 | 5.52MΩ | −82 | −4 | −1.4 |
| 17 | 10.0 | 90.0 | — | 1.0* | 1.0 | — | 45.0 | 5.48MΩ | −81 | −3 | −1.3 |
| 18 | 10.0 | 90.0 | 1.0* | — | — | 1.0* | 45.0 | 3.35MΩ | −86 | −6 | −0.8 |
| 19 | 10.0 | 90.0 | 2.0* | — | 1.0* | — | 45.0 | 5.03MΩ | −88 | −3 | −1.5 |
| 20 | 10.0 | 90.0 | — | 2.0* | 1.0* | — | 45.0 | 5.58MΩ | −81 | −3 | −1.5 |

As is apparent from the results, by comparison of the respective sets of Example 1 and Comparative Example 1; Example 2 and Comparative Example 2; Example 3 and Comparative Example 3; Examples 4 to 6 and Comparative Example 4; Examples 7 to 12 and Comparative Example 5; and Examples 13 and 14 and Comparative Examples 6 and 7, the resistors according to the present invention are significantly improved in TCR as compared with the comparative resistors at the same resistance levels. Also, resistors of the invention exhibit considerable improvements in noise and VCR over the comparative resistors.

For further comparison, there are provided two additional comparative resistors of Comparative Examples 8 and 9 having the compositions given in Table 2 wherein the ratios of ruthenium oxide and glass were the same as Examples 1 and 3, respectively. The above measurements were conducted on the comparative resistors by following the measuring method set forth above and the results are shown in Table 2 together with those of Examples of 1 and 3.

TABLE 2

| | Ruthenium Oxide (part) | Glass (part) | Lanthanum Oxide (part) | Organic Vehicle (part) | Sheet Resistivity (ohms/sq.) |
|---|---|---|---|---|---|
| Example 1 | 24.5 | 75.5 | 3.0 | 45.0 | 141.0kΩ |
| Comparative Example 8 | 24.5 | 75.5 | — | 45.0 | 38.1lΩ |
| Example 3 | 16.3 | 83.7 | 1.0 | 45.0 | 550.4kΩ |
| Comparative Example 9 | 16.3 | 83.7 | — | 45.0 | 282.3kΩ |

From the foregoing Table 2, it will be understood that lanthanum oxide serves effectively to increase resistance.

Further, it will be appreciated from similar comparisons between Examples 9 and 10 with Comparative Example 4; Examples 11 and 13 with Comparative Examples 6; Examples 12 and 14 with Comparative Example 7; and Examples 15 to 20 with Comparative Example 5, that the other additive oxides increase resistance value without deteriorating noise and VCR, in the same way as lanthanum oxide.

As mentioned above in detail, the present invention remarkably improves the TCR property in the high resistance ranges by adding at least one additive oxide selected from the group consisting lanthanum oxide, neodymium oxide, praseodymium oxide and samarium oxide to the ruthenium oxide-glass type resistor compositions, and controls the TCR values to the desirable level near zero. In addition to the effect of improving TCR, the invention improves noise and VCR, and thus, the resistor compositions and the resistors produced therefrom are very useful for practical applications.

What is claimed is:

1. A composition adapted to form a resistor by coating said composition onto an electrically insulating substrate and firing the coated substrate, which consists essentially of (a) ruthenium oxide; (b) glass; (c) at least one metal oxide selected from the group consisting of lanthanum oxide, neodymium oxide, praseodymium oxide and samarium oxide; and (d) a liquid organic vehicle, wherein the weight ratio of said ruthenium oxide (a) to said glass (b) is in the range of 30:70 to 5:95 and the total amount of said metal oxide (c) is in the range of 0.05 to 7 parts by weight per 100 parts by combined weight of said ruthenium oxide (a) and said glass (b), said composition being in the form of finely divided particles dispersed in said vehicle (d).

2. A composition as claimed in claim 1, wherein finely divided particles of each of said ruthenium oxide (a), said glass (b), and said metal oxide (c) are admixed with and dispersed in said vehicle (d).

3. A composition as claimed in claim 1, wherein said finely divided particles include particles prepared by incorporating at least one member selected from the group consisting of said ruthenium oxide (a) and said metal oxide (c) into said glass (b) by fusing said glass therewith, and then the resulting fused glass product is crushed to form finely divided particles.

4. A composition as claimed in claim 1, wherein said metal oxide (c) is in the form of particles having a particle size of not more than 10 $\mu m$.

5. A composition as claimed in claim 2, wherein said particles of metal oxide (c) have particle sizes in the range of from 0.1 to 2 $\mu m$.

6. A composition as claimed in claim 1, wherein said glass (b) is selected from the group consisting of borosilicate glasses, borate glasses, and mixtures thereof.

7. A resistor comprising an electrically insulating substrate and a resistor film formed on said substrate by coating a resistor composition on said substrate and firing the resulting coated substrate, said resistor composition consisting essentially of (a) ruthenium oxide, (b) glass, (c) at least one metal oxide selected from the group consisting of lanthanum oxide, neodymium oxide, praseodymium oxide and samarium oxide, and (d) a liquid organic vehicle, wherein the weight ratio of said ruthenium oxide (a) to said glass (b) is in the range of 30:70 to 5:95 and the total amount of said metal oxide (c) is in the range of 0.05 to 7 parts by weight per 100 parts by weight of said ruthenium oxide (a) and said glass (b), said resistor composition being in the form of finely divided particles dispersed in said vehicle (d).

8. A resistor as claimed in claim 7, wherein said electrically insulating substrate is made of a material selected from the group consisting of ceramic, glass, and porcelained enamel steel, and said glass (b) is selected from the group consisting of borosilicate glasses and borate glasses.

9. A resistor as claimed in claim 7, wherein said resistor is prepared by coating said resistor composition onto said insulating substrate, drying said composition to remove said vehicle (d) therefrom, and firing said dried composition and said insulating substrate at a temperature in the range of 500° C. to 1000° C.

10. A resistor as claimed in claim 7, wherein said resistor composition consists of (a), (b), (c) and (d).

11. A resistor as claimed in claim 7, wherein said metal oxide (c) is in the form of particles having a particle size not greater than 10 $\mu m$.

* * * * *